US012765647B2

(12) United States Patent
Willemin et al.

(10) Patent No.: US 12,765,647 B2
(45) Date of Patent: Oct. 20, 2026

(54) BRACELET FOR A PORTABLE OBJECT, SUCH AS A TIMEPIECE, WITH A MAGNIFYING DEVICE

(71) Applicant: The Swatch Group Research and Development Ltd, Marin (CH)

(72) Inventors: Michel Willemin, Prêles (CH); Nicolas Francois, Neuchâtel (CH); Pierpasquale Tortora, Neuchâtel (CH); Marek Dovcik, Mougins (CH); Sophie Napoli, Neuchâtel (CH); Cedric Nicolas, Neuchâtel (CH); Stewes Bourban, Chabrey (CH)

(73) Assignee: The Swatch Group Research and Development Ltd, Marin (CH)

( * ) Notice: Subject to any disclaimer, the term of this patent is extended or adjusted under 35 U.S.C. 154(b) by 311 days.

(21) Appl. No.: 18/589,810

(22) Filed: Feb. 28, 2024

(65) Prior Publication Data

US 2024/0365936 A1 Nov. 7, 2024

(30) Foreign Application Priority Data

May 2, 2023 (EP) .................................... 23171138

(51) Int. Cl.
*A44C 5/00* (2006.01)
*G04B 47/00* (2006.01)

(52) U.S. Cl.
CPC ............ *A44C 5/0007* (2013.01); *G04B 47/00* (2013.01)

(58) Field of Classification Search
CPC .............................. A44C 5/0007; G04B 47/00
(Continued)

(56) References Cited

U.S. PATENT DOCUMENTS 5,601,222 A * 2/1997 Haddad ................ A44C 5/0007 359/810
6,480,441 B1 * 11/2002 Mckay ................... G04B 47/00 359/809
(Continued)

FOREIGN PATENT DOCUMENTS

CN 107510185 A 12/2017
CN 212873223 U 4/2021
(Continued)

OTHER PUBLICATIONS

European Search Report for EP 23 17 1138 dated Sep. 12, 2023.

*Primary Examiner* — Peter N Helvey
(74) *Attorney, Agent, or Firm* — Sughrue Mion, PLLC

(57) ABSTRACT

A bracelet (10) for a portable object (1) including a first strand (11) and a second strand (12), each of the strands (11, 12) including a first end able to be attached to a case (2) of the portable object (1), wherein the first strand (11) includes a first optical device (21) having a first diameter (L1); the second strand (12) includes a second optical device (22) having a second diameter (L2), smaller than the first diameter (L1) of the first optical device (21), the first optical device (21) and the second optical device (22) being configured so that the superposition of the first optical device (21) and of the second optical device (22), by the superposition of the first strand (11) and of the second strand (12), forms a microscope having an eyepiece constituted by the first optical device (21) and an objective constituted by the second optical device (22).

15 Claims, 1 Drawing Sheet

(58) Field of Classification Search
USPC ........................................................ 224/165
See application file for complete search history.

(56) References Cited

U.S. PATENT DOCUMENTS

| | | | | |
|---|---|---|---|---|
| 6,614,604 | B1 * | 9/2003 | Budde .................. | G02B 25/002 359/822 |
| 9,664,889 | B2 * | 5/2017 | Krajewska ............. | G02B 27/04 |
| 11,246,384 | B2 * | 2/2022 | Berry ................... | A44C 5/0007 |
| 2011/0005274 | A1 | 1/2011 | Greubel et al. | |
| 2021/0000229 | A1 * | 1/2021 | Berry ................. | A44C 15/0015 |

FOREIGN PATENT DOCUMENTS

| | | | | | |
|---|---|---|---|---|---|
| CN | 213690233 | U | * | 7/2021 | |
| CN | 214963087 | U | * | 12/2021 | |
| CN | 118892240 | A | * | 11/2024 | ........... A44C 5/0053 |
| JP | 3147058 | U | | 12/2008 | |
| JP | 2010-518928 | A | | 6/2010 | |

* cited by examiner

BRACELET FOR A PORTABLE OBJECT, SUCH AS A TIMEPIECE, WITH A MAGNIFYING DEVICE

CROSS REFERENCE TO RELATED APPLICATION

This application claims priority to European Patent Application No. 23171138.3 filed May 2, 2023, the entire contents of which are incorporated herein by reference.

TECHNICAL FIELD OF THE INVENTION

The present invention relates to a bracelet intended to be fixed to the case of a portable object, such as a timepiece, for example to the case of a watch.

The invention relates more particularly to a bracelet comprising a magnifying device enabling the user to observe components or details of the wearable object or of another object, for example a timepiece.

TECHNOLOGICAL BACKGROUND

Such bracelets or straps incorporating a magnifying device such as a magnifying glass or Fresnel lens are known. For example, U.S. Pat. No. 5,601,222 describes a watch strap incorporating a magnifying strip integrated into one strand of the strap.

However, the magnification of such a device is limited and unconvincing when it comes to observing very small details, for example of a watch movement fitted to the timepiece.

Consequently, there is a need to improve such devices.

SUMMARY OF THE INVENTION

In this context, the invention proposes a bracelet for a portable object comprising a first strand and a second strand, each of the strands comprising a first end capable of being attached to a case of the portable object, characterised in that:

- the first strand comprises a first optical device having a first diameter;
- the second strand comprises a second optical device with a second diameter, smaller than the first diameter of the first optical device;

the first optical device and the second optical device being configured so that the superposition of the first optical device and the second optical device, by superposing the first strand and the second strand, forms a microscope having an eyepiece constituted by the first optical device and an objective constituted by the second optical device.

In addition to the features mentioned in the previous paragraph, the bracelet according to the invention may have one or more additional features from among the following, considered individually or in any technically possible combination:

- the first optical device is a first optical lens;
- the second optical device is a second optical lens;
- the first optical lens of the first optical device has a focal length f1 of 100 mm and in that said second lens of the second optical device has a focal length f2 of 27 mm;
- the first optical device and/or the second optical device are made of synthetic material, polymer material, mineral material, preferably glass or sapphire glass;
- the first optical device is integrated, at least partially, into the thickness of the first strand, preferably completely into the thickness of the first strand;
- the second optical device is integrated, at least partially, into the thickness of the second strand, preferably completely into the thickness of the second strand;
- the bracelet comprises at least one spacer configured to ensure spacing between the first optical device and the second optical device when the first strand and the second strand of the bracelet are superimposed;
- the bracelet comprises a loop, said at least one spacer being formed by said loop;
- the bracelet has two spacers;
- the bracelet comprises a first loop and a second loop forming said two spacers, the first loop and the second loop having dimensions configured to ensure spacing between the first optical device and the second optical device when the first strand and the second strand are superimposed;
- the two loops can be adjusted in position so as to cover the first optical device or the second optical device to form a protective element for the optical devices, particularly when the portable object is being worn;
- the bracelet comprises means for ensuring concentric superposition of the first optical device and the second optical device;
- the bracelet comprises coupling means for holding the two superimposed strands in position;
- the bracelet is made of leather, metal, polymer, synthetic material, ceramic, natural material, biosourced material or a combination of at least two of the said materials listed.

The invention also relates to a timepiece comprising a case incorporating a watch movement and a bracelet according to the invention attached to the case.

BRIEF DESCRIPTION OF THE FIGURES

The aims, advantages and characteristics of the present invention will become apparent from the detailed description below with reference to the following figures.

In all figures, common elements have the same reference numbers unless otherwise specified.

DETAILED DESCRIPTION OF THE INVENTION

Figure 1:
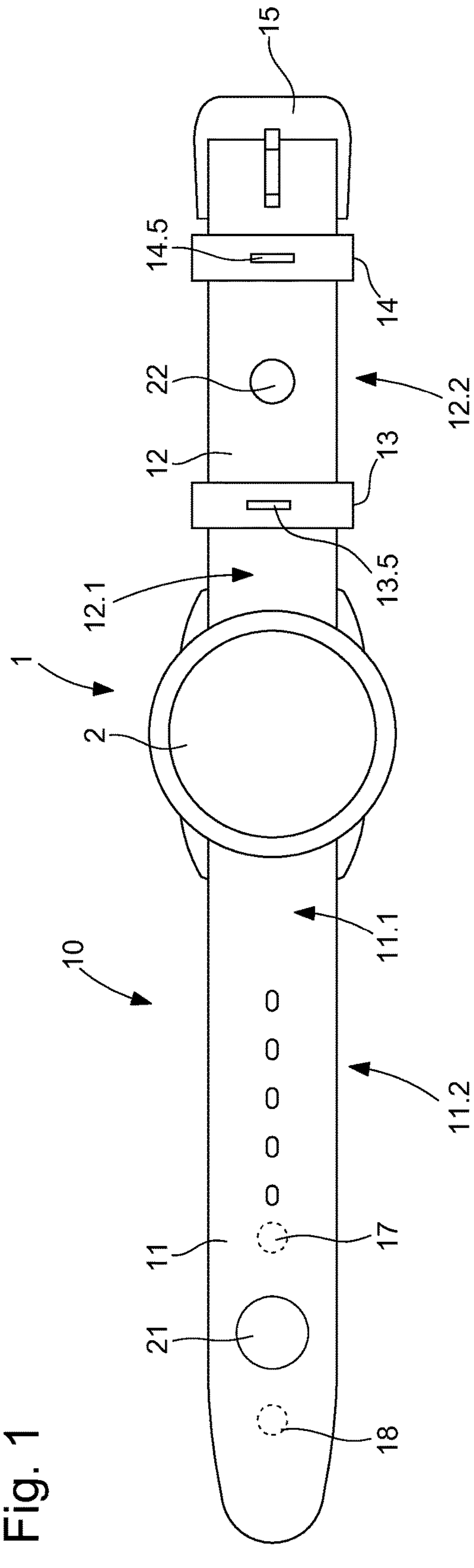
FIG. 1 schematically represents a top view of a portable object 1 according to the invention.

FIG. 1 shows schematically a top view of a portable object 1 according to the invention.

Figure 2:
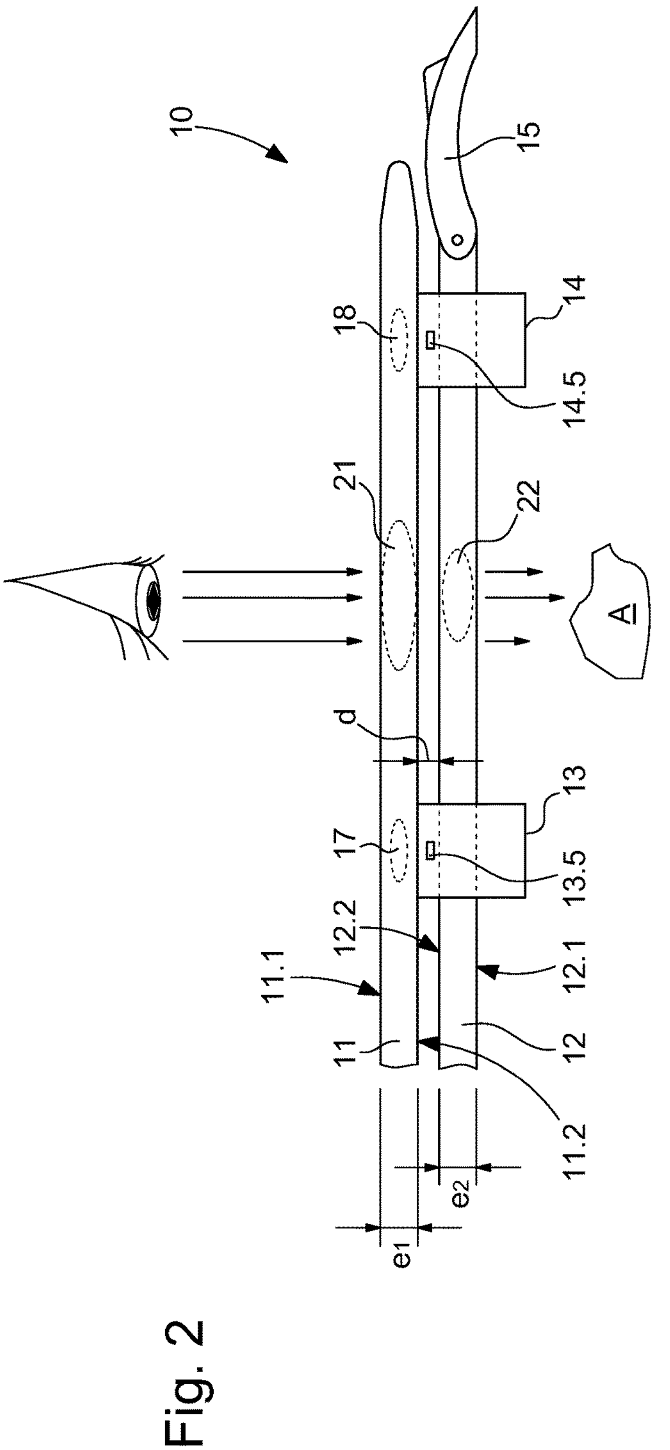
FIG. 2 schematically represents a side view of the portable object 1 illustrated in FIG. 1.

FIG. 2 shows a schematic side view of the portable object 1 shown in FIG. 1.

This portable object 1 here takes the form of a timepiece, such as a wristwatch intended to be worn on the user's wrist. It will also be understood that the portable object 1 may be any other portable object intended to be worn via a bracelet, for example on the wrist.

The portable object 1 comprises a case 2, designed to receive a horological movement, for example (not shown here for reasons of clarity).

The horological movement carries and drives means for displaying information, for example the current time.

The portable object 1 also comprises a flexible or articulated bracelet 10, two ends of which are intended to be coupled, for example removably, to the middle of the case 2, via an ad hoc fastening system which will not be detailed in this application.

The bracelet 10 comprises a first strand 11 with a thickness e and a second strand 12 with a thickness $e_2$, each of the strands 11, 12 being attached at one end to the case 2.

The bracelet 10 typically comprises a clasp 15, for example a pin buckle, a single or double folding clasp, a clip, slide, scratch or elastic clasp, enabling the other two ends of the strands 11, 12 of the bracelet 10 to be attached and the portable object 1 to be worn on the wrist.

The first strand 11 comprises a first optical device 21 integrated, at least partially, into the thickness $e_1$ of the first strand 11. The first optical device 21 is, for example, an optical lens.

The first optical device 21 is characterised by a first diameter L1 and a first focal length f1.

The second strand 12 comprises a second optical device 22 integrated, at least partially, into the thickness $e_2$ of the second strand 12. The second optical device 22 is, for example, an optical lens.

The second optical device 22 is characterised by a second diameter L2 and a second focal length f2.

The diameter L1 of the first optical device 21 is greater than the diameter L2 of the second optical device 22.

For example, the first optical device 21 is an optical lens with a plano-convex shape.

For example, the first optical device 21 is an optical lens with a diameter L1 of 15 mm, a focal length f1 of 60 mm and a central thickness of 2 mm.

For example, the second optical device 22 is an optical lens with a plano-convex shape.

For example, the second optical device 22 is an optical lens with a diameter L2 of 9 mm, a focal length f2 of 13.5 mm and a central thickness of 2 mm.

The bracelet 10 is configured to allow the first strand 11 and the second strand 12 to be superimposed so as to superimpose the first optical device 21 and the second optical device 22 in order to create a magnifying device of the portable microscope type consisting of an eyepiece formed by the first optical device 21 and an objective formed by the second optical device 22.

By combining the optical properties of the optical devices 21, 22 described above, and superimposing them with a separation distance d of 1.5 mm, with the first optical device 21 as the eyepiece and the second optical device 22 as the objective, we obtain a microscope-type magnifying device with a resulting focal length of the order of 11 mm, which corresponds to a magnification of the order of ×22.

Of course, the superimposition mentioned in the previous paragraph is possible when the user is not wearing the object on his wrist.

To form the portable microscope of the bracelet 10, the first strand 11 comprising the first optical device 21 constituting the microscope eyepiece is positioned above the second strand 12 comprising the second optical device 22 constituting the microscope objective.

Thus, to form the portable microscope, the first strand 11 is intended to be on the user's side and the second strand 12 is intended to be on the side of the object A to be observed, as shown in FIG. 2.

The first optical device 21 and/or the second optical device 22 are made of synthetic material, polymer material or mineral material.

Preferably, the first optical device 21 and/or the second optical device 22 are made of glass or sapphire glass.

Preferably, the first optical device 21 is completely integrated into the thickness $e_1$ of the first strand 11. Thus, the thickness $e_1$ of the first strand 11 is greater than the thickness of the first optical device 21.

For example, the first optical device 21 is flush with at least an upper external surface 11.1 or a lower external surface 11.2 of the first strand 11.

For example, the first optical device 21 may project from the upper external surface 11.1 of the first strand 11, but a portion of the first optical device 21 projecting from the lower external surface 11.2 should be avoided to prevent discomfort when carrying the portable object 1.

Preferably, the second optical device 22 is completely integrated into the thickness $e_2$ of the second strand 12. In this way, the thickness $e_2$ of the second strand 11 is greater than the thickness of the second optical device 21.

For example, the second optical device 22 is flush with at least one upper external surface 12.1 or lower external surface 12.2 of the second strand 12.

For example, the second optical device 22 may project from the upper external surface 12.1 of the second strand 12, but a portion of the second optical device 22 projecting from the lower external surface 12.2 should be avoided to prevent discomfort when carrying the portable object 1.

In the present application, the upper external surfaces are considered to be the surfaces of the bracelet 10 visible to the user, and the lower external surfaces are the surfaces of the bracelet in contact, at least partially, with the wearer's skin.

The bracelet 10 comprises at least one spacer to provide a separation distance between the first optical device 21 and the second optical device 22 when the first strand 11 and the second strand 12 of the bracelet 10 are superimposed, so as to ensure the correct spacing d according to the characteristics of the optical devices 21, 22.

Preferably the bracelet 10 comprises two spacers. The spacers are located, for example, on either side of the first optical device 21 and the second optical device 22.

Typically, the bracelet 10 has two loops 13, 14 mounted on the second strand 12 of the bracelet 10.

For example, a first loop 14 is fixed to the second strand 12 and a second loop 13 is mobile, i.e. movable along the second strand 12 and therefore adjustable in position on the bracelet 10.

According to one variant, the first loop 14 and the second loop 13 are mobile, i.e. they can be moved along the second strand 12 and their position on the bracelet 10 can therefore be adjusted.

Of course, the loops 13, 14 can be mounted on the first strand 11 of the bracelet 10, or each strand 11, 12 of the bracelet 10 can carry a loop 13, 14.

The mobility of the loops 13, 14 means that they can be positioned opposite the optical devices 21, 22 so as to cover them and form a protective element when the user wears the portable object 1 on his wrist.

Preferably, when the first loop 14 is fixed, the second loop 13 is movable and has a width equivalent to or greater than the diameter L1 of the first optical device 21 so that it can completely cover the first optical device 21.

For example, the loops 13, 14 are configured to form the spacers of the bracelet 10 and ensure a spacing (or separation distance) d between the first optical device 21 and the second optical device 22. In this way, the loops 13, 14 have the dimensions required to ensure the spacing d required according to the optical devices 21, 22 used.

The bracelet 10 may comprise means for ensuring concentric superposition of the first optical device 21 and the second optical device 22.

The bracelet 10 can also comprise coupling elements to keep the two strands 11, 12 superimposed on each other in contact, so as to facilitate observation by the user who does not need to keep the two strands 11, 12 in position. The coupling elements are, for example, reversible mechanical or magnetic coupling elements.

Non-limiting examples comprise mechanical coupling elements of the pressure type or magnetic and ferromagnetic elements for magnetic coupling.

For example, each of the loops 13, 14 can incorporate a ferromagnetic body 13.5, 14.5 in its material thickness and the strand of the bracelet 10 that does not carry the loops 13, 14 (in our example, the first strand 11) can incorporate two magnets 17, 18 in its thickness, configured to cooperate with the ferromagnetic bodies 13.5, 14.5 by magnetic attraction.

The bracelet 10 can be made of leather, metal, synthetic material, polymer material, ceramic material, natural material, biosourced material, or a combination of at least two of the said materials listed.

Depending on the material used to manufacture the bracelet 10, the optical devices 21, 22 can be inserted into cut-outs or housings provided for this purpose and then secured together by gluing, welding, etc.

The optical devices 21, 22 can also be attached to the strands 11, 12 of the bracelet 10 by overmoulding.

The invention claimed is:

1. A bracelet (10) for a portable object (1) comprising a first strand (11) and a second strand (12), each of the strands (11, 12) comprising a first end able to be attached to a case (2) of the portable object (1), wherein:

- the first strand (11) comprises a first optical device (21) with a first diameter (L1);
- the second strand (12) comprises a second optical device (22) with a second diameter (L2), smaller than the first diameter (L1) of the first optical device (21);

the first optical device (21) and the second optical device (22) being configured so that the superposition of the first optical device (21) and the second optical device (22), by the superposition of the first strand (11) and the second strand (12), forms a microscope having an eyepiece constituted by the first optical device (21) and an objective constituted by the second optical device (22).

2. The bracelet (10) for a portable object (1) according to claim 1, wherein the first optical device (21) is a first optical lens.

3. The bracelet (10) for a portable object (1) according to claim 1, wherein the second optical device (22) is a second optical lens.

4. The bracelet (10) for a portable object (1) according to claim 1, wherein the first optical device (21) and/or the second optical device (22) are made of synthetic material, polymer material, mineral material, preferably glass or sapphire glass.

5. The bracelet (10) for a portable object (1) according to claim 1, wherein the first optical device (21) is integrated, at least partially, into the thickness ($e_1$) of the first strand (11), preferably completely into the thickness ($e_1$) of the first strand (11).

6. The bracelet (10) for a portable object (1) according to claim 1, wherein the second optical device (21) is integrated, at least partially, into the thickness ($e_2$) of the second strand (12), preferably completely into the thickness ($e_2$) of the second strand (12).

7. The bracelet (10) for a portable object (1) according to claim 1, wherein the bracelet (10) comprises at least one spacer (13, 14) configured to ensure a spacing (d) between the first optical device (21) and the second optical device (22) when the first strand (11) and the second strand (12) of the bracelet (10) are superimposed.

8. The bracelet (10) for a portable object (1) according to claim 7, wherein the bracelet (10) comprises a loop (13, 14), said at least one spacer being formed by said loop.

9. The bracelet (10) for a portable object (1) according to claim 7, wherein the bracelet (10) comprises two spacers (13, 14).

10. The bracelet (10) for a portable object (1) according to claim 9, wherein the bracelet (10) comprises a first loop (13) and a second loop (14) forming said two spacers, the first loop (13) and the second loop (14) having dimensions configured to ensure spacing (d) between the first optical device (21) and the second optical device (22) when the first strand (11) and the second strand (12) are superimposed.

11. The bracelet (10) for a portable object (1) according to the claim 10, wherein the two loops (13, 14) are adjustable in position so as to cover the first optical device (21) or the second optical device (22) to form an element for protecting the optical devices (21, 22).

12. The bracelet (10) for a portable object (1) according to claim 11, wherein the bracelet (10) comprises means for ensuring concentric superposition of the first optical device (21) and the second optical device (22).

13. The bracelet (10) for a portable object (1) according to claim 12, wherein the bracelet (10) comprises coupling means (13.5, 14.5, 17, 18) for holding in position the first strand (11) and the second strand (120) superimposed.

14. The bracelet (10) for a portable object (1) according to claim 13, wherein the bracelet (10) is made of leather, metallic material, polymer material, synthetic material, ceramic material, natural material, biosourced material or a combination of at least two of the said listed materials.

15. A wearable object (1) including a timepiece comprising a case (2) incorporating a watch movement, and the bracelet according to claim 1 attached to said case (2).

* * * * *